(12) United States Patent
Ando

(10) Patent No.: US 7,239,661 B2
(45) Date of Patent: Jul. 3, 2007

(54) MEDIA DATA PROCESSING APPARATUS AND MEDIA DATA PROCESSING METHOD

(75) Inventor: Tsutomu Ando, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/426,312

(22) Filed: Apr. 30, 2003

(65) Prior Publication Data

US 2003/0206586 A1  Nov. 6, 2003

(30) Foreign Application Priority Data

May 1, 2002 (JP) .............................. 2002-129796
Apr. 1, 2003 (JP) .............................. 2003-098044

(51) Int. Cl.
*H04N 11/02* (2006.01)
*H04N 7/12* (2006.01)
*H04N 7/167* (2006.01)

(52) U.S. Cl. .................................. 375/240.01; 725/31
(58) Field of Classification Search ........... 375/240.01; 713/150, 176, 180; 358/3.28; 340/5.26; 380/26; 725/31

See application file for complete search history.

(56) References Cited

U.S. PATENT DOCUMENTS 6,415,031 B1 * 7/2002 Colligan et al. ............ 380/200

2002/0035723 A1 * 3/2002 Inoue et al. .................... 725/1

OTHER PUBLICATIONS

Hartung et al., 'Digital Rights Management and Watermarking of Multimedia Content for M-Commerce Applications', Nov. 2000, IEEE Communications Magazine, pp. 78-84.*
Keith Hill, 'A Perspective: The Role of Identifiers in Managing and Protecting Intellectual Property in the Digital Age', Jul. 1999, Proceedings of the IEEE, vol. 87, No. 7, pp. 1228-1238.*

* cited by examiner

*Primary Examiner*—Gims Philippe
*Assistant Examiner*—Erick Rekstad
(74) *Attorney, Agent, or Firm*—Fitzpatrick, Cella, Harper & Scinto

(57) ABSTRACT

A media data processing apparatus includes an input unit that inputs media data and intellectual property management data for managing intellectual property of the media data, a first encoding unit that encodes the media data, a second encoding unit that encodes the intellectual property management data, and a transmission unit that transmitted in packets the encoded media data, first timing information that controls decoding timings for the media data, the encoded intellectual property management data, second timing information that controls decoding timings of the encoded intellectual property management data, and synchronizing information for synchronizing the intellectual property management data and the media data.

18 Claims, 10 Drawing Sheets

MEDIA DATA PROCESSING APPARATUS AND MEDIA DATA PROCESSING METHOD

BACKGROUND OF THE INVENTION

1. Field of the Invention

The present invention relates to a media data processing apparatus and a media data processing method, and more particularly to a synchronizing control for a plurality information data sets.

2. Related Background Art

In recent years, a variety of methods for distributing multimedia data including texts, moving picture (video), voice (audio), and the like via a network in real time have come in practice.

FIG. 1 shows a structure of a conventional multimedia processing section on a receiving side. Referring to FIG. 1, a receiver section 101 receives video and audio bitstreams through a transmission path. The bitstreams will be described below in greater detail. A demultiplexer 102 separates the received bitstreams into video bitstreams and audio bitstreams. A video decoder 103 decodes the separated video bitstreams. An audio decoder 105 decodes the separated audio bitstreams.

A synchronizing control section 104 receives video and audio synchronizing control data (time stamps) from the demultiplexer 102, and performs a synchronizing control for reproducing both of the data. The time stamps will be described below in greater detail.

A video reproducing control section 106 performs a video reproduction to provide users with images on a video reproducing device (i.e., a display) 108. An audio reproducing control section 107 performs an audio reproduction to provide users with sounds to be produced on an audio reproducing device (i.e., speakers) 109.

FIG. 2 shows a structure of a conventional multimedia processing section on a transmission side unit. Referring to FIG. 2, a video processing section 201 receives inputs of video sources, and performs pre-processings such as appropriate conversion (for example, A-to-D conversion) and encoding on the inputted video sources. An audio processing section 202 receives inputs of audio sources, and performs pre-processings such as appropriate conversion and encoding on the inputted audio sources. A video encoder 203 encodes video signals. An audio encoder 205 encodes audio signals.

A synchronizing control section 204 controls to synchronize the video encoder 203 and the audio encoder 205. A multiplexer 206 inserts header information, time stamps and the like to multiplex the media data.

The multiplexed bitstreams are stored in a storage 207, which may be a hard disk (HD) that stores multimedia data. In response to requests from a client, a distribution server 208 distributes bitstreams to the receiver section 101 at the client.

FIG. 3 shows a structure of multiplexed bitstreams. Normally, data is compressed (encoded) by an optimum method, and the compressed data format is called a "bitstream". Also, when video and audio multimedia data (which may be simply referred to below as "multimedia data") are simultaneously transmitted, each of the data is divided into segments each having a specified size (which is called a "packet") and superposed with the other, as indicated in FIG. 3.

In FIG. 3, the multimedia data includes header information 307 which is added to each packet, video bitstreams 308, 310 and 312, and audio bitstreams 509, 511 and 513.

The multimedia data also includes time stamps 301-306 which are time information. The time stamps 301, 303 and 305 are time stamps for the respective video bitstreams that immediately follow. Also, the time stamps 302, 304 and 306 are time stamps for the respective audio bitstreams that immediately follow. Also, configuration data of the time stamp may be included in header information for each packet.

FIG. 4 shows a structure of a multimedia processing section at the receiving side in MPEG-4 standard. In ISO/IEC SC29/WG11 14496-1 (MPEG-4 Systems) standard, formats of bitstreams and methods for synchronizing video data and audio data are standardized. Also, MPEG-4 standard specifies intellectual property management methods. In MPEG-4, Binary Format for Scene description (BIFS) is used as a method for scene description, and data are transmitted as a single media stream.

In FIG. 4, bitstreams are separated by a demultiplexer 402 and stored in buffers 403-406 for decoding BIFS, each media, and Intellectual Property Management and Protection (IPMP) information, respectively; and decoding processings for the respective bitstreams are performed by decoders 407-409, respectively, in the succeeding stage. In this instance, scene information is composed by a scene tree generation section 411 with the BIFS stream, and information required for IPMP processings (for example, an encryption key) is decoded with the IPMP stream.

An IPMP control section 410 controls operations of the decoders and a compositor 412. More specifically, based on the decoded IPMP information, the IPMP control section 410 performs on or off controls for decoding and composing each of the media, or performs restricted reproduction controls. A renderer 413 outputs the media to a display 414 and speakers 415 for reproducing video and audio signals.

FIG. 5 shows an example of time stamps in a conventional video processing in MPEG-4 Systems. In this MPEG-4 Systems, two kinds of time stamps called DTS (Decode Time Stamp) and CTS (Composition Time Stamp) are defined.

Each DTS shown in FIG. 5 indicates a processing start time by each of the decoders, and each CTS indicates a composition processing start time. Video AU1, Video AU2, Video AU3, . . . indicate consecutive video access units (in units of decoding), respectively, and DTS and CTS corresponding to each of the video access units Video AU1, Video AU2, Video AU3, . . . are transmitted. However, there may be an occasion where one of DTS and CTS may be omitted. In this case, time stamps are treated as being DTS=CTS.

FIG. 5 also shows in its lower section IPMP information IPMP AU1, IPMP AU2, IPMP AU3, . . . , which are time stamps of IPMP data with which the video bitstreams are processed. The IPMP information IPMP AU1, IPMP AU2, IPMP AU3, . . . , correspond to the video access units Video AU1, Video AU2, Video AU3, . . . , respectively.

In this manner, the IPMP data is also treated as one kind of bitstreams like other media streams such as video and audio bitstreams, and are subject to reproduction control at each stage on the receiving side. For example, information concerning an encryption key may be embedded in the IPMP data, and the encryption key may be updated (for each of the access units) according to the time stamps.

However, the above example of conventional art has the following problems.

1. Time stamps added to IPMP streams are treated in the same manner as other media streams, and handling of composition time stamps (CTS) for IPMP and their operations are not defined.

Here, the composition is an act that is rendered on media streams, and IPMP streams do not characteristically render composition on themselves.

2. Synchronization relations between time stamps added to IPMP streams and time stamps added to other media streams are not defined, such that media data and IPMP data cannot be synchronized in units of access units.

3. In order to hide the information concerning an encryption key, the information concerning the encryption key may be subject to an encryption processing or may be embedded in IPMP data by using an electronic watermark technique. However, in these cases, the IPMP data need to be processed by different processing methods, such that the processings of the IPMP data cannot be flexibly expressed.

The methods for processing IPMP data are different from each other as described above because of the following reasons. When the encryption technique is used, the IPMP data is first decrypted and then the decrypted data is decoded to extract the information concerning the encryption key. On the other hand, when the electronic watermark technique is used, the information is first decoded, and the information concerning the encryption key is extracted from the decoded data.

SUMMARY OF THE INVENTION

The present invention relates to a media data processing apparatus and a media data processing method that can reliably synchronize encoded media data and encoded intellectual property management data for managing intellectual property of the media data at the time of data reproduction, and correctly manage the intellectual property of the media data.

In accordance with an embodiment of the present invention, a media data processing apparatus is formed from an input unit that inputs media data and intellectual property management data for managing intellectual property of the media data, a first encoding unit that encodes the media data, a second encoding unit that encodes the intellectual property management data, and a transmission unit that transmitted in packets the encoded media data, first timing information that controls decoding timings for the media data, the encoded intellectual property management data, second timing information that controls decoding timings of the encoded intellectual property management data, and synchronizing information for synchronizing the intellectual property management data and the media data.

In accordance with another embodiment of the present invention, a media data processing apparatus is formed from a receiving unit that receives bitstreams of encoded media data, first timing information that controls decoding timings for the media data, encoded intellectual property management data, second timing information that controls decoding timings of the encoded intellectual property management data, and synchronizing information for synchronizing the intellectual property management data and the media data transmitted in packets, a first decoding unit that decodes the encoded intellectual property management data according to the second timing information, a second decoding unit that decodes the encoded media data according to the first timing information, and a control unit that controls outputs of the media data according to the synchronizing information and the decoded intellectual property management data.

In accordance with an embodiment of the present invention, a media data processing method includes an input step of inputting media data and intellectual property management data for managing intellectual property of the media data, a first encoding step of encoding the media data, a second encoding step of encoding the intellectual property management data, and a transmission step of transmitting in packets the encoded media data, first timing information that controls decoding timings for the media data, the encoded intellectual property management data, second timing information that controls decoding timings of the encoded intellectual property management data, and synchronizing information for synchronizing the intellectual property management data and the media data.

In accordance with another embodiment of the present invention, a media data processing method is provided for processing media data including intellectual property management data, wherein the media data processing method includes a receiving step of receiving bitstreams of encoded media data, first timing information that controls decoding timings for the media data, encoded intellectual property management data, second timing information that controls decoding timings of the encoded intellectual property management data, and synchronizing information for synchronizing the intellectual property management data and the media data transmitted in packets, a first decoding step of decoding the encoded intellectual property management data according to the second timing information, a second decoding step of decoding the encoded media data according to the first timing information, and a control step of controlling outputs of the media data according to the synchronizing information and the decoded intellectual property management data.

Other objects, features and advantages of the invention will become apparent from the following detailed description taken in conjunction with the accompanying drawings.

DETAILED DESCRIPTION OF THE PREFERRED EMBODIMENTS

Embodiments of the present invention will be described in detail below with reference to the accompanying drawings.

First, descriptions will be made as to the structure and operations of a multimedia processing section in accordance with an embodiment of the present invention provided on a receiving side that receives bitstreams with time stamps dedicated to IPMP processing (hereafter called "ITS") appended thereto.

Figure 1:
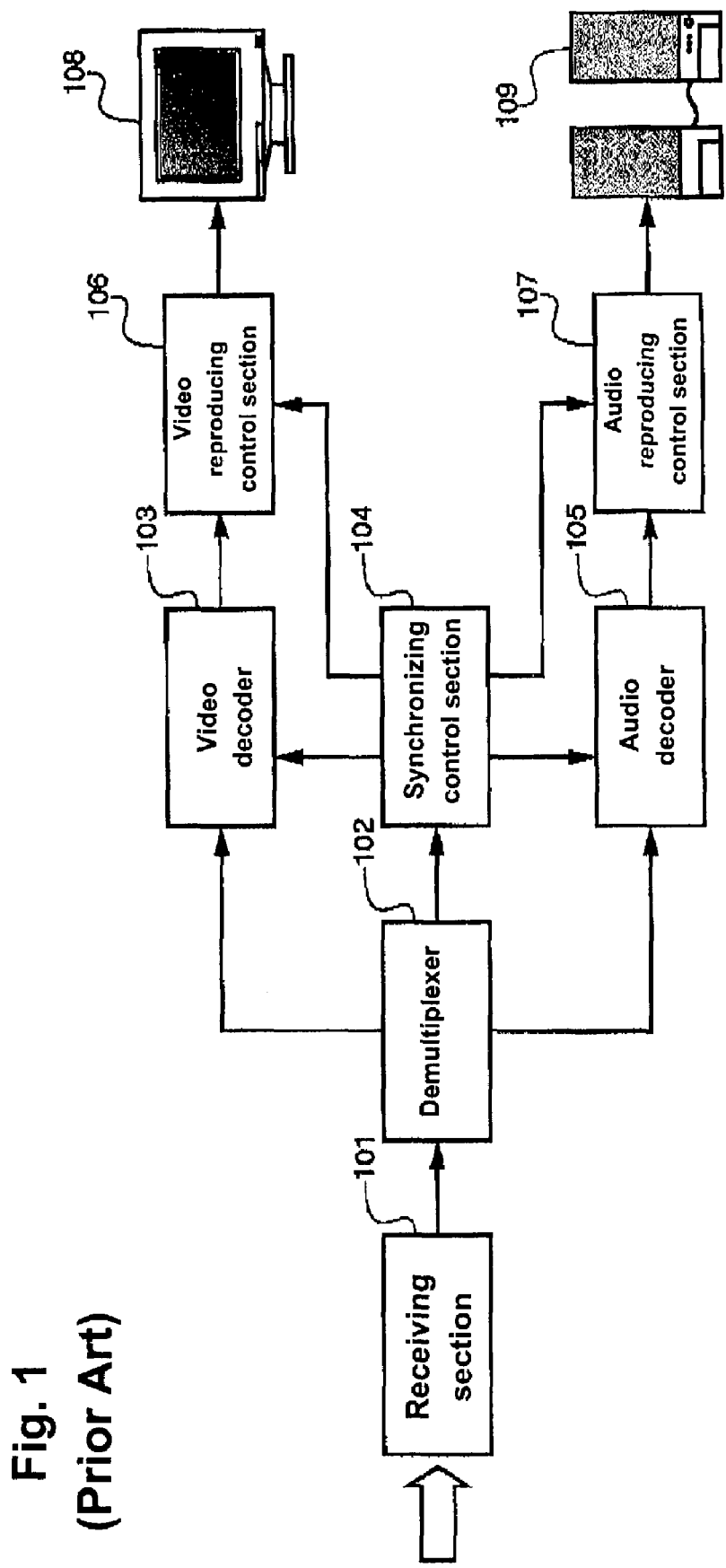
FIG. 1 shows a structure of a conventional multimedia processing section at a receiving side.
Figure 2:
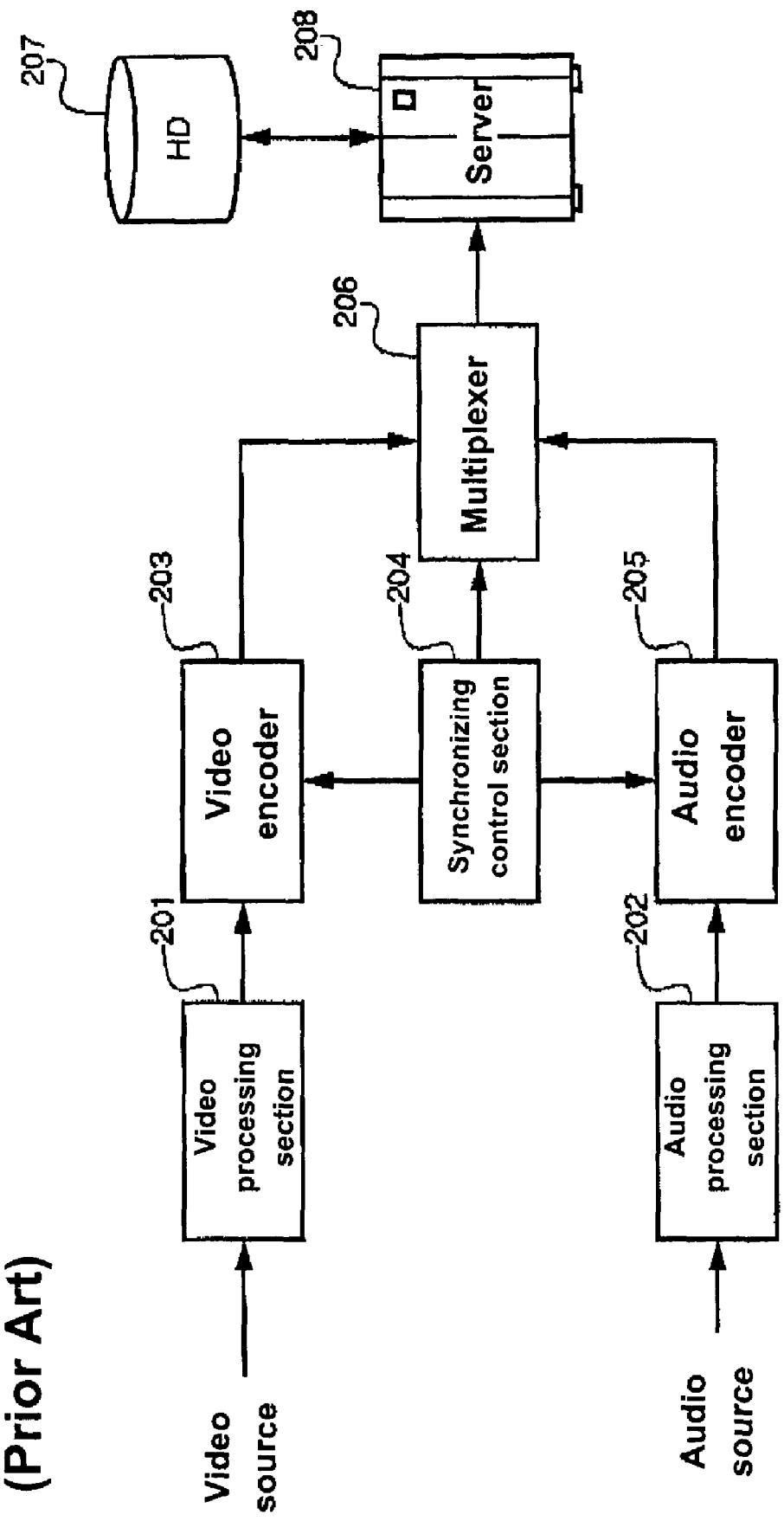
FIG. 2 shows a structure of a conventional multimedia processing section at a transmission side.
Figure 3:
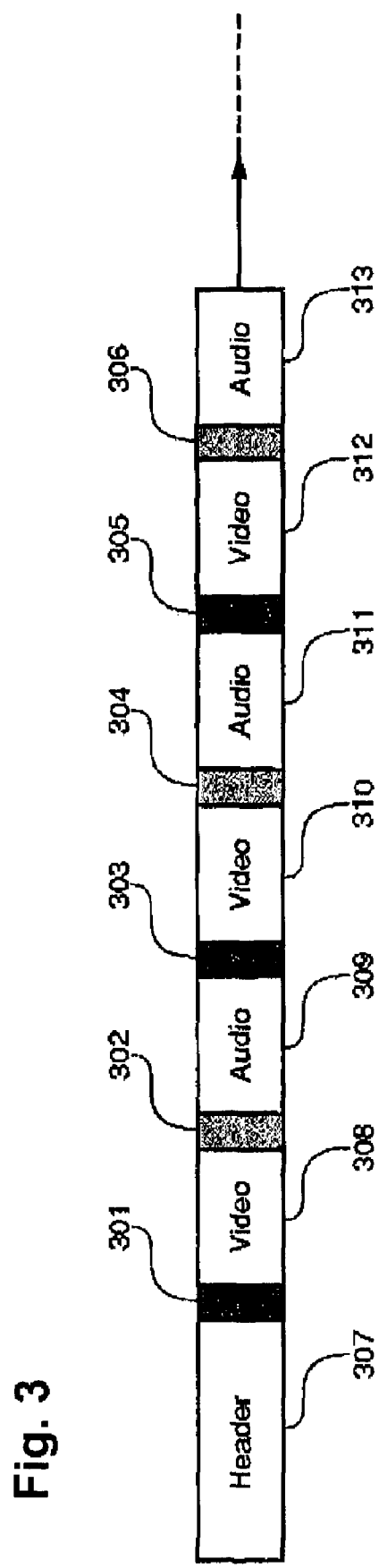
FIG. 3 shows a structure of multiplexed bitstreams.
Figure 4:
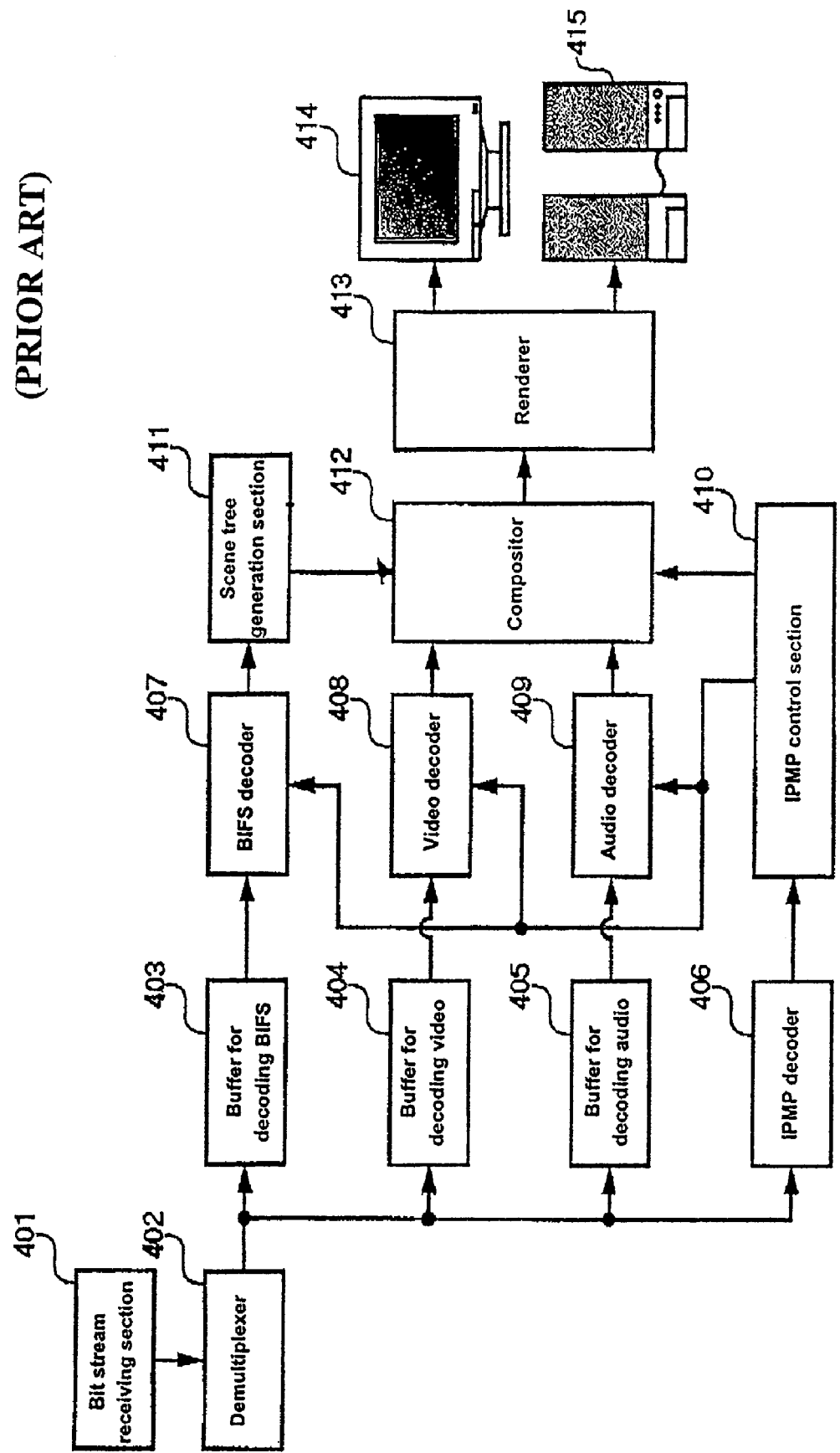
FIG. 4 shows a structure of a multimedia processing section at the receiving side in MPEG-4 standard.
Figure 5:
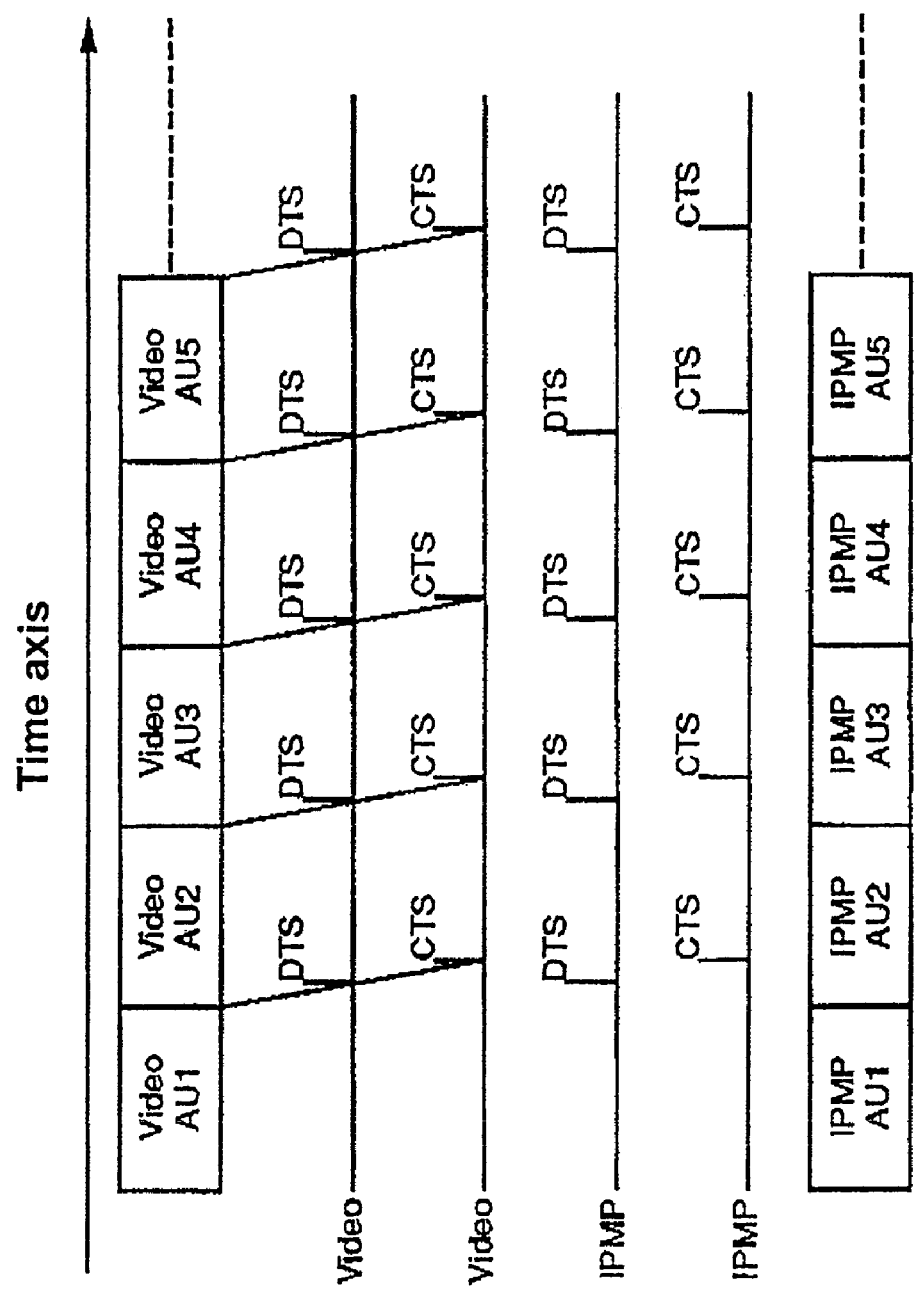
FIG. 5 shows an example of time stamps in a conventional video processing.
Figure 6:
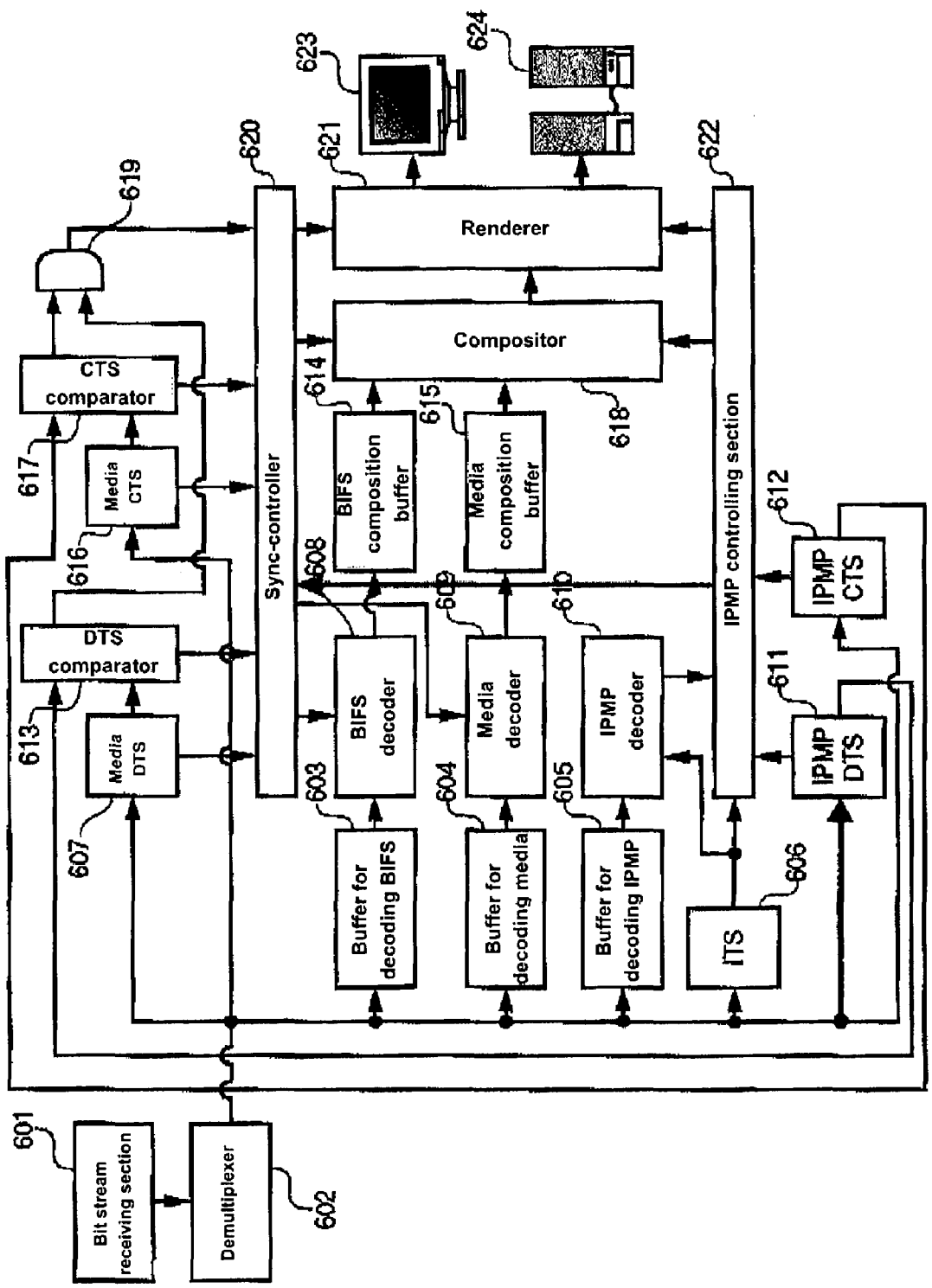
FIG. 6 shows a structure of a multimedia processing section at a receiving side in accordance with an embodiment of the present invention.

FIG. 6 shows a structure of a multimedia processing section at a receiving side in accordance with an embodiment of the present invention.

Referring to FIG. 6, a bitstream receiving section 601 receives bitstreams that are multiplexed from a server. A demultiplexer 602 demultiplexes the multiplexed bitstreams, and extracts each of the bitstreams. Here, each of the extracted bitstreams is independently stored in a buffer for BIFS decoding 603, a buffer for media decoding 604 (wherein video and audio are generally called "media" in the present embodiment), and a buffer for IPMP decoding 605, respectively. The stored bitstreams are decoded by a BIFS decoder 608, a media decoder 609 and an IPMP decoder 610, respectively.

In some cases, as described below, decoding processings for BIFS and each of the media may be prohibited by the IPMP processing.

Also, the demultiplexer 602 outputs time stamps for media streams and IPMP streams, respectively. The multimedia processing section also includes a media DTS detector 607, a media CTS detector 616, an IPMP DTS detector 611 and an IPMP CST detector 612.

In the present embodiment, an ITS detector 606 extracts time stamps dedicated to IPMP processing which are referred to as ITS, and control decoding timings of the IPMP decoder 610. Decode time stamps (DTSs) and composition time stamps (CTSs) for the media and the IPMP are compared by a DTS comparator 613 and a CTS comparator 617, respectively, to check whether or not the DTSs and the CTSs of the media and the IPMP are in consistent with each other, respectively. An AND gate 619 provides logical products (ANDs) under conditions when the DTSs and CTSs of the media and the IPMP are in consistent with each other, respectively.

Accordingly, the AND gate 619 outputs a true value "1" only when the DTSs and CTSs for the media are in consistent with the DTSs and CTSs for the IPMP, respectively. In other words, with the structure described above, a determination can be made as to whether or not the DTSs and CTSs for the media are completely in consistent with the DTSs and CTSs for the IPMP, respectively.

A sync-controller 620 governs decoding timing control for the decoders, synchronization control among the media and reproduction timing control. When the DTSs and CTSs for the media are completely in consistent with the DTSs and CTSs for the IPMP, respectively, and assumes that updates of the IPMP data correspond to the corresponding access units of the media. As a more specific example, let us consider a situation where the media data has been scrambled, and its descrambling key changes periodically. In this case, a normal reproduction becomes impossible unless each of the access units of the media and the update timing of the descrambling key are accurately defined. The sync-controller 620 monitors outputs of the DTS comparator 613 and the CTS comparator 617 and controls the timings. More specifically, sync-controller 620 controls timings for descrambling the media data that are supplied to the respective decoders and update timings of the descrambling key.

A BIFS composition buffer 614 composes scene information that have been decoded by the BIFS decoder. A media composition buffer 615 temporarily stores a specified amount of decoded image frames and audio data.

When the IPMP method uses only a data scrambling, each of the media is composed (re-constructed) by a compositor 618 without a further change, and displayed or reproduced by a renderer 621.

A monitor apparatus 623 provides a final rendering on the image (or video) media (for display), and a speaker apparatus 624 provides a rendering on the audio media (for audio reproduction).

When the IPMP method uses not only a data scrambling but also a control for reproduction or non-reproduction of the media, display and reproduction of each of the media must be accurately started (or stopped) at intended timings. In this case also, like the above case in which only the data scrambling is used, display and reproduction of each of the media can be accurately started (or stopped) in units of access units through controlling the compositor 618 and the renderer 621 by the sync-controller 620 based on the comparison results of the DTS comparator 613 and the CTS comparator 617.

Figure 10:
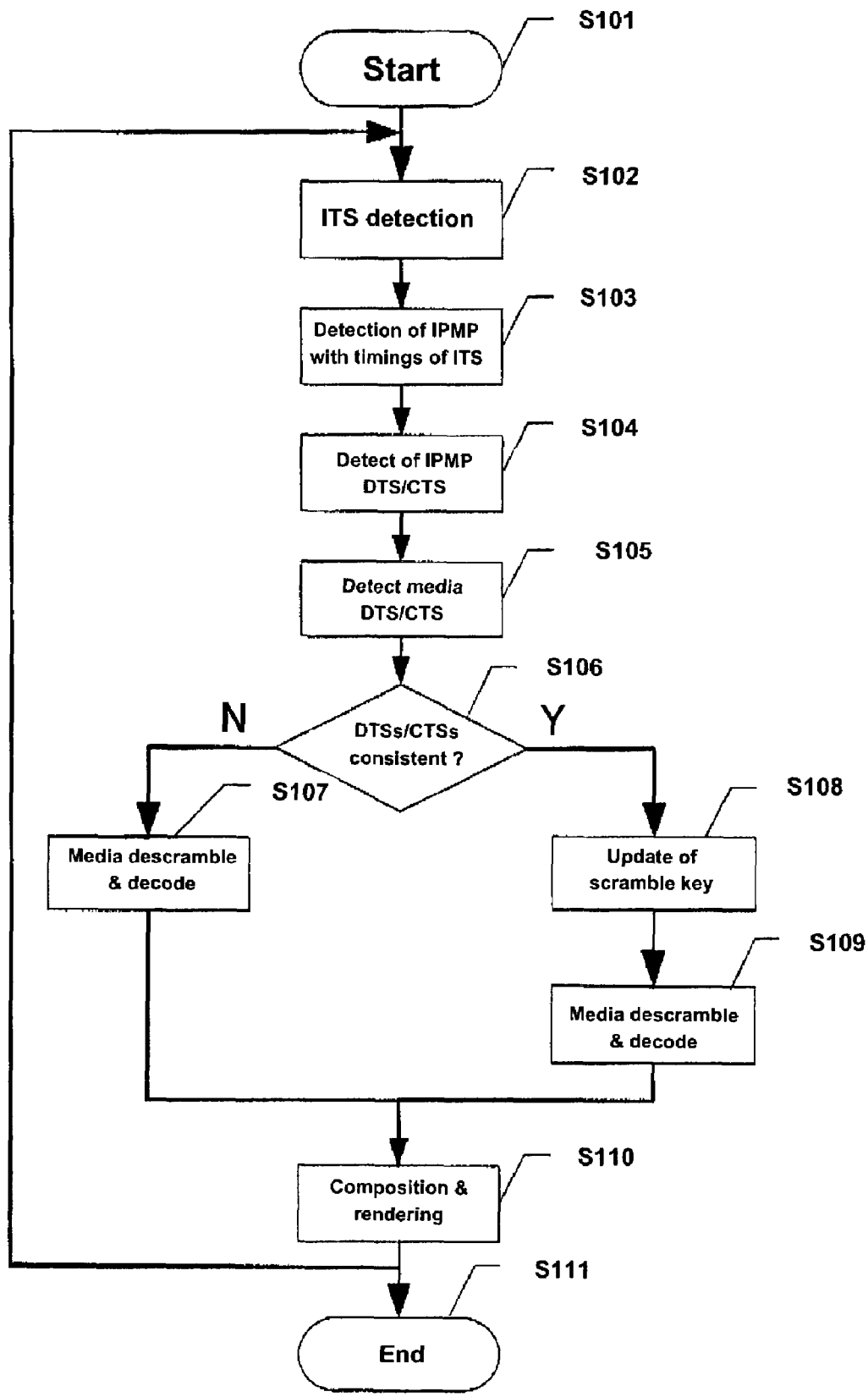
FIG. 10 shows a flow chart for describing a descrambling processing.

FIG. 10 shows a flow chart for describing a descrambling processing. When decoding is started (step S101), the ITS detector 606 detects ITSs (step S102).

Then, the IPMP decoder 610 decodes the IPMP data with the timings of the ITSs detected (step S103). The decoding processing of the IPMP data may correspond, when a scramble key itself is multi-scrambled (encrypted), to a processing to extract the scramble key to decode the media data.

Then, DTSs and CTSs of the IPMP data are detected by the IPMP DTS detector 611 and the IPMP CTS detector 612, respectively (step S104). DTSs and CTSs of each of the media data are also detected by the media DTS detector 607 and the media CTS detector 617, respectively (step S105).

Then, the DTSs and CTSs of the IPMP data and the DTSs and CTSs of each of the media are compared by the DTS comparator 613 and the CTS comparator 617, respectively. When they are not in consistent with each other, a determination is made that the scramble key has not been updated, and the media data is descrambled with the current scramble key, and decoded (step S107).

On the other hand, when they match with each other, a determination is made that the scramble key has been updated, the scramble key is updated (step S108), and then the media data is descrambled and decoded (step S109).

Then, the compositor 618 performs a composition processing and the renderer 621 performs a rendering processing (step S110), and these processings are repeated until the end of the data (step S111).

It is noted that, when the IPMP method uses not only a data scrambling but also a control for reproduction or non-reproduction of the media, additional display and reproduction controls are performed in step S110.

Next, descriptions will be made as to the structure and operations of a multimedia processing section in accordance with an embodiment of the present invention provided on a transmission side that transmits bitstreams with ITSs appended thereto.

Figure 7:
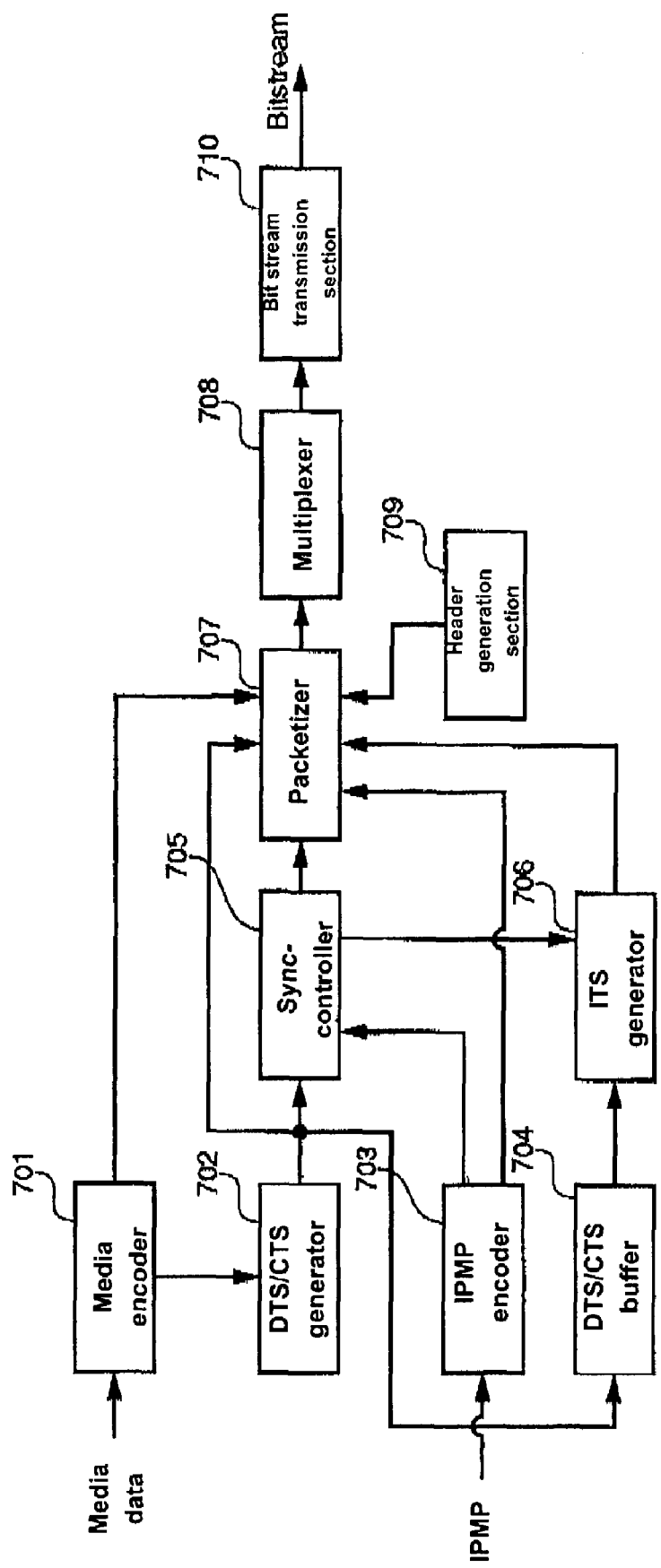
FIG. 7 shows a structure of a multimedia processing section at a transmission side in accordance with an embodiment of the present invention.

FIG. 7 shows the structure of a multimedia processing section on a transmission side in accordance with the present embodiment.

Referring to FIG. 7, a media encoder 701 performs an encoding for each of the media data, which is suitable for each of the media. For example, when the media data is image data, the media encoder 701 performs an encoding on the media data according to MPEG-4 Visual (ISO/IEC 14496-2), and performs a scrambling processing with a scramble key.

A DTS/CTS generator 702 generates time stamps (DTSs and CTSs) according to reproduction conditions of each of the media.

An IPMP encoder 703 performs an encoding processing on the IPMP information. The encoding processing on the IPMP data may corresponds to a processing to scramble (encrypt) the scramble key itself.

A DTS/CTS buffer 704 temporarily stores time stamps (DTSs and CTSs) that are generated by the DTS/CTS generator 702.

A sync-controller 705 receives inputs of the DTSs and CTSs generated by the DTS/CTS generator 702 and the IPMP information that is encoded (scrambled or encrypted) by the IPMP encoder 703, and performs a synchronizing control for reproducing each of the media, and also controls generation of ITS information to be described below. An ITS generator 706 generates ITS information for each of access units according to an instruction from the sync-controller 705 based on the DTSs and CTSs stored in the DTS/CTS buffer 704.

A packetizer 707 performs an appropriate packetizing processing using the encoded media information and IPMP information, the DTSs, the CTSs, and the ITS information. Since the values of the DTSs and CTSs of the IPMP are the same as those of the media information, the DTS/CTS generator 702 generats DTSs and CTSs for the IPMP.

At the time of the packetizing processing, a header generation section 709 adds headers, and a multiplexer 708 performs a final multiplexing. Then a bitstream transmission section 710 transmits the data multiplexed by the multiplexer 709.

Figure 8:
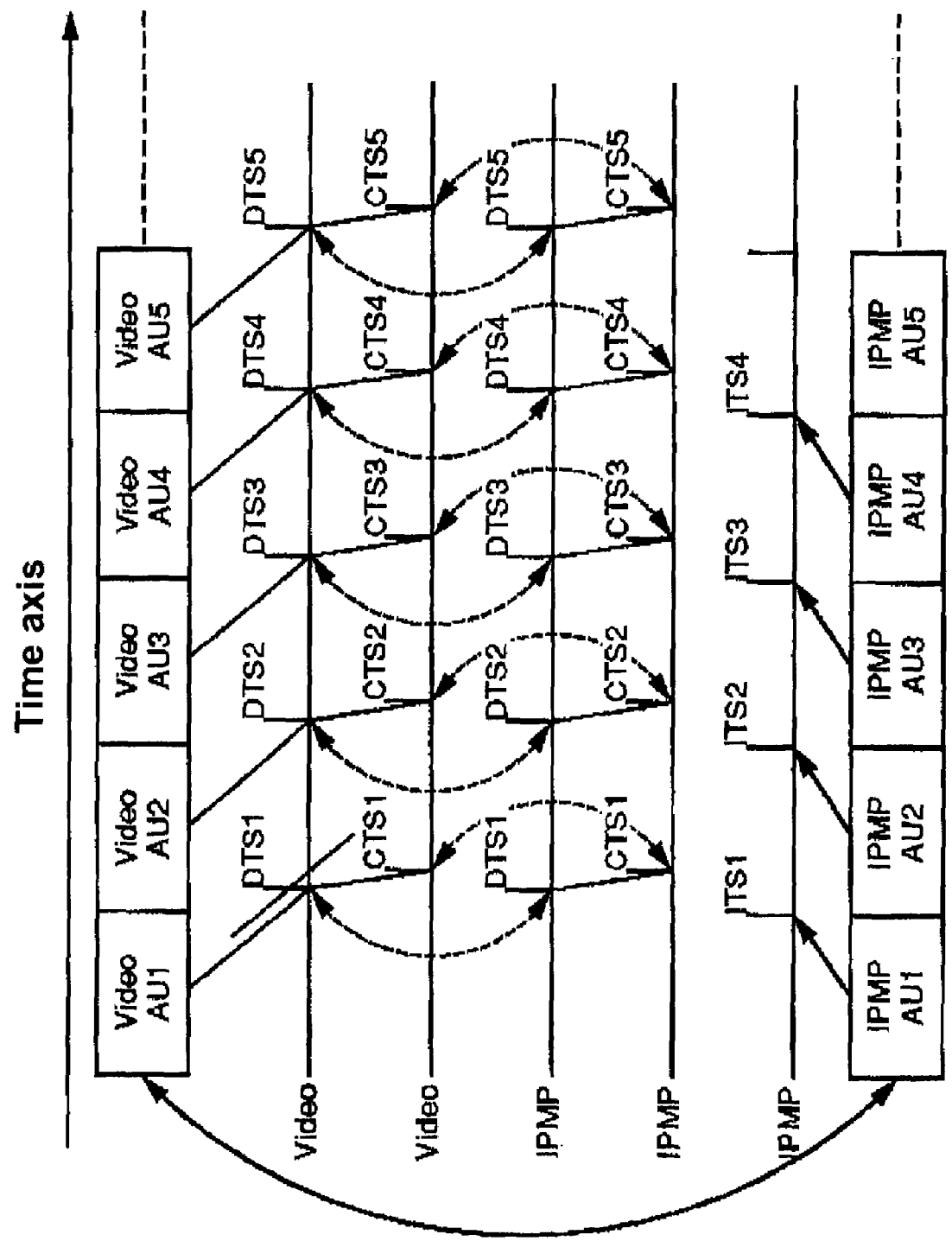
FIG. 8 shows a timing chart of time stamps in accordance with an embodiment of the present invention.

FIG. 8 shows a timing chart of time stamps in accordance with an embodiment of the present invention.

FIG. 8 shows video streams as one example of media streams, but the media streams can be of any type. What is to be focused on is the relations between the DTSs and CTSs of the video and DTSs and CTSs of the IPMP.

For example, when a video access unit 1 (Video AU1) has a decode start timing DTS1 and a composition start timing CTS1, a DTS and a CTS of the IPMP stream for this access unit have the same values as the DTS1 and the CTS1, respectively. In other words, by making the values of DTSs and CTSs for each video access unit and each IPMP access unit equal to one another, the video access unit and the IPMP access unit can be correlated to each other.

Accordingly, DTSs and CTSs for the IPMP streams do not indicate decoding and composition timings of themselves, but are used for correlating each of the media streams and each of the access units.

In the meantime, decoding (for example, descrambling a scrambled encryption master key that is used to descramble the video bitstreams) timings of the IPMP streams can be controlled in units of access units of the IPMP streams themselves by ITSs that are additionally defined.

Another embodiment of the present invention in which an electronic watermark technique is applied will be described below with reference to the accompanying drawings. In the present embodiment example, an electronic watermark technique is used to embed scramble keys for media data in IPMP data, and ITSs indicate processing timings for extracting (decoding) the scramble keys embedded by the electronic watermark technique.

Figure 9:
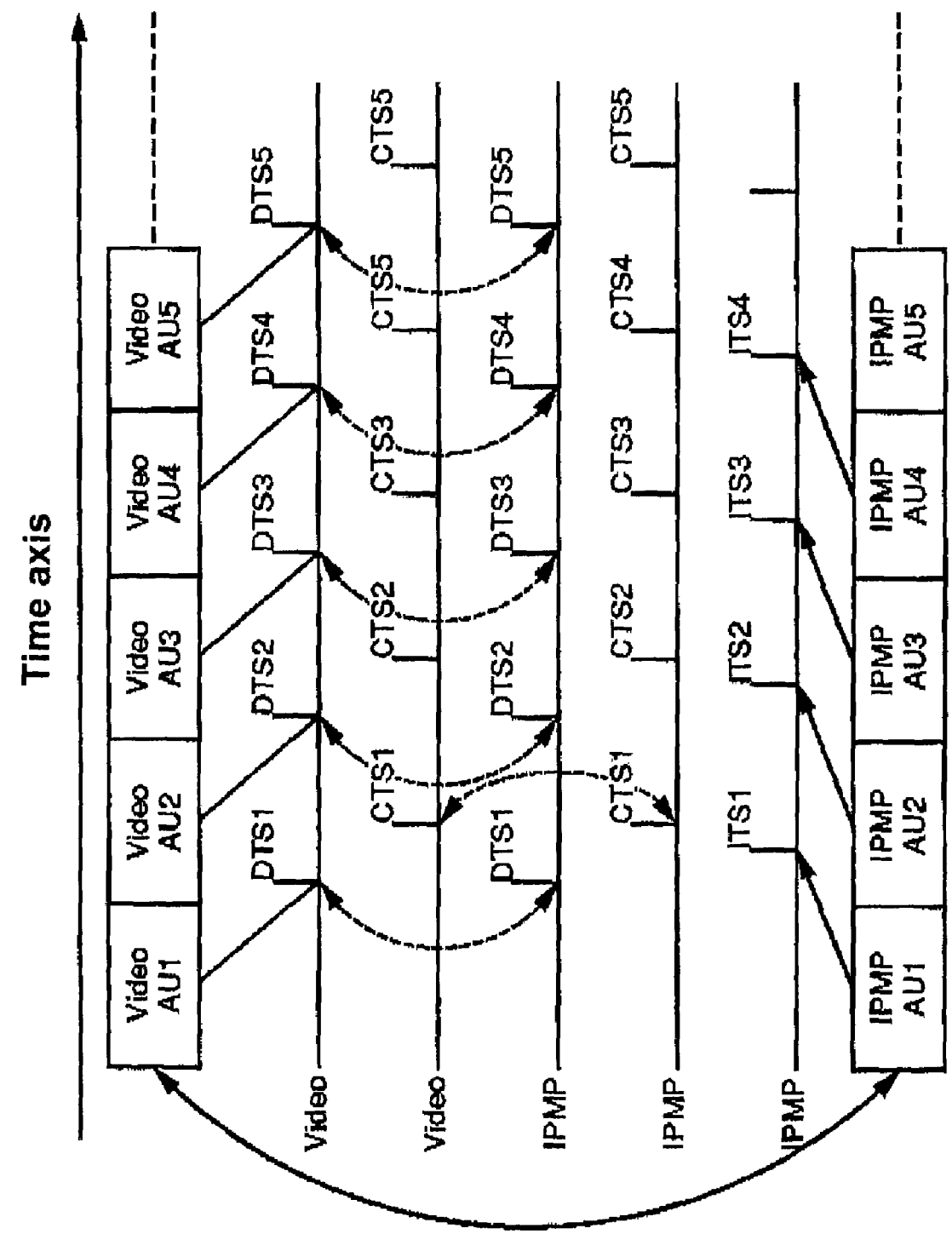
FIG. 9 shows a timing chart of time stamps in accordance with another embodiment of the present invention.

FIG. 9 shows a timing chart of time stamps in accordance with the other embodiment.

DTSs and CTSs shown in FIG. 9 are used for the purpose of indicating mutual relations among the access units of the media streams and the IPMP streams. In the embodiment described with reference to FIG. 8, the present invention is applied to a system that uses an encryption scheme, for example. However, when media bitstreams have been scrambled, the media bitstreams need a descrambling processing, and then a decoding processing and a composing processing to be performed. Accordingly, a relation $ITS \leq DTS \leq CTS$ is established (see FIG. 8). When the time stamps ITS, DTS and CTS are equal to one another, such relation indicates an ideal state where all of the processings can be executed in no (zero) time. Accordingly, the IPMP processing controls operations of the decoder (i.e., the IPMP processing has the decoder perform a decoding processing or not perform a decoding processing).

On the other hand, in the system using an electronic watermark technique, electronically watermarked data are extracted from decoded bitstreams, and therefore the decoding processing must be performed first, and then the IPMP processing controls operations of the compositor (i.e., the IPMP processing has the compositor perform a composition processing or not perform a composition processing).

In view of the above, the time stamps have a relation $DTS \leq ITS \leq CTS$. FIG. 9 shows a timing chart in this case.

In this manner, in accordance with the present invention, time stamps exclusively used for IPMP processings (i.e., ITSs) are additionally provided, such that timings of ITSs can be flexibly controlled based on DTSs and CTSs for the media streams.

The embodiments described above (e.g., the circuits indicated by block diagrams in FIGS. 6 and 7) may be realized by hardware. However, the entire system in accordance with the embodiments of the present invention can be realized by software.

Also, in the embodiments described above, video and audio data are handled as examples of multimedia data. However, the present invention is also applicable to texts and graphics data.

As described above, in accordance with the embodiments of the present invention, a variety of IPMP processings are reliably synchronized, and can be flexibly composed.

The present invention may be applicable to a system that is composed of a plurality of apparatuses (for example, a host computer, interface devices, readers, printers and the like), or to a unit that is composed of a single apparatus (for example, a copy machine, a facsimile machine or the like).

The present invention can be achieved by having a storage medium that stores program codes of software that realize the functions of the embodiments described above supplied to a system or an apparatus, and by having a computer (or a CPU or an MPU) of the system or the apparatus read and execute the program codes stored in the storage medium.

In this case, the program codes themselves that are read from the storage medium realize the functions of the embodiment of the present invention, and the storage medium that stores the program codes constitute the present invention.

The storage medium to supply the program codes may be, for example, a flexible disk, a hard disk, an optical disk, an optical magnetic disk, a DVD, a CD-ROM, a CD-R, a magnetic tape, a nonvolatile memory card, or a ROM.

Furthermore, the present invention is applicable not only when the program codes read by a computer are executed to realize the functions of the embodiments, but also when an operating system that operates on the computer performs a part or all of the actual processing based on the instructions contained in the program codes and thereby realizes the functions of the embodiments.

Moreover, the present invention is also applicable when the program codes that are read from the storage medium are written on a memory of an expansion board inserted into a computer or of an expansion unit connected to a computer, and a CPU provided on the expansion board or on the expansion unit performs a part or all of the actual processing based on the instructions contained in the program codes and thereby realizes the functions of the embodiments.

As described above, in accordance with the embodiments of the present invention, synchronization control information appended to media data and synchronization control information appended to IPMP information are synchronized, and information that indicates timings to start processings that are defined by the IPMP information are generated in association with the respective synchronization control information. As a result, processings for intellectual property management can be flexibly performed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A media data processing apparatus comprising:
    an input unit that inputs media data and intellectual property management data for managing intellectual property of the media data;
    a first encoding unit that encodes the media data;
    a second encoding unit that encodes the intellectual property management data; and
    a transmission unit that transmits in packets the encoded media data, first timing information that is related to the encoded media data to control decoding timings for the encoded media data, the encoded intellectual property management data, second timing information that is generated by making reference to the first timing information and is related to the encoded intellectual property management data to control decoding timings of the encoded intellectual property management data, and synchronizing information that has the same contents as the first timing information and is related to the encoded intellectual property management data to control synchronization between the intellectual property management data and the media data.

2. A media data processing apparatus according to claim 1, wherein the first timing information are decode time stamps and composition time stamps specified by MPEG-4 systems (ISO/IEC 14496-1).

3. A media data processing apparatus according to claim 1, wherein the intellectual property management data is intellectual property management and protection data specified by MPEG-1 (ISO/IEC 14496-1).

4. A media data processing apparatus according to claim 3, wherein the media data is image data, the first encoding unit scrambles the image data by compressing and encoding the image data, and the second encoding unit scrambles the intellectual property management data.

5. A media data processing apparatus according to claim 4, wherein the intellectual property management data includes key data for descrambling the image data that is scrambled.

6. A media data processing apparatus comprising:
    a receiving unit that receives bitstreams of encoded media data, first timing information that is related to the encoded media data to control decoding timings for the encoded media data, encoded intellectual property management data, second timing information that is generated by making reference to the first timing information and is related to the encoded intellectual property management data to control decoding timings of the encoded intellectual property management data, and synchronizing information that has the same contents as the first timing information and is related to the encoded intellectual property management data to control synchronization between the intellectual property management data and the media data, transmitted in packets;
    a first decoding unit that decodes the encoded intellectual property management data according to the second timing information;
    a second decoding unit that decodes the encoded media data according to the first timing information; and
    a control unit that controls outputs of the media data according to the synchronizing information and the decoded intellectual property management data.

7. A media data processing apparatus according to claim 6, wherein the first timing information includes decode time stamps and composition time stamps specified by MPEG-4 systems (ISO/IEC 14496-1).

8. A media data processing apparatus according to claim 6, wherein the intellectual property management data is intellectual property management and protection data specified by MPEG-4 (ISO/IEC 14496-1).

9. A media data processing apparatus according to claim 8, wherein the encoded media data that is received by the receiving unit includes image data that is compressed and encoded, and the encoded intellectual property management data is scrambled.

10. A media data processing apparatus according to claim 9, wherein the media data that is encoded is scrambled, and the intellectual property management data includes key data for descrambling the media data.

11. A media data processing system comprising:
    an input unit that inputs media data and intellectual property management data for managing intellectual property of the media data;
    a first encoding unit that encodes the media data;
    a second encoding unit that encodes the intellectual property management data;
    a transmission unit that transmits in packets the encoded media data, first timing information that is related to the encoded media data to control decoding timings for the encoded media data, the encoded intellectual property management data, second timing information that is generated by making reference to the first timing information and is related to the encoded intellectual property management data to control decoding timings of the encoded intellectual property management data, and synchronizing information that has the same contents as the first timing information and is related to the encoded intellectual property management data to control synchronization between the intellectual property management data and the media data;

a receiving unit that receives bitstreams of the encoded media data, the first timing information that controls decoding timings for the encoded media data, the encoded intellectual property management data, the second timing information that controls decoding timings of the encoded intellectual property management data, and the synchronizing information for synchronizing the intellectual property management data and the media data, transmitted in packets by the transmission unit;

a first decoding unit that decodes the encoded intellectual property management data according to the second timing information;

a second decoding unit that decodes the encoded media data according to the first timing information; and a control unit that controls outputs of the media data according to the synchronizing information and the decoded intellectual property management data.

12. A media data processing system according to claim 11, wherein the first timing information are decode time stamps and composition time stamps specified by MPEG-4 systems (ISO/IEC 14496-1).

13. A media data processing system according to claim 11, wherein the intellectual property management data is intellectual property management and protection data specified by MPEG-4 (ISO/IEC 14496-1).

14. A media data processing method comprising:
an input step of inputting media data and intellectual property management data for managing intellectual property of the media data;
a first encoding step of encoding the media data;
a second encoding step of encoding the intellectual property management data; and
a transmission step of transmitting in packets the encoded media data, first timing information that is related to the encoded media data to control decoding timings for the encoded media data, the encoded intellectual property management data, second timing information that is generated by making reference to the first timing information and is related to the encoded intellectual property management data to control decoding timings of the encoded intellectual property management data, and synchronizing information that has the same contents as the first timing information and is related to the encoded intellectual property management data to control synchronization between the intellectual property management data and the media data.

15. A computer program product recorded on a computer-readable medium and embodying a computer-executable program for implementing the media data processing method recited in claim 14.

16. A media data processing method comprising:
a receiving step of receiving bitstreams of encoded media data, first timing information that controls decoding timings for the encoded media data, encoded intellectual property management data, second timing information that is generated by making reference to the first timing information and is related to the encoded intellectual property management data to control decoding timings of the encoded intellectual property management data, and synchronizing information that has the same contents as the first timing information and is related to the encoded intellectual property management data to control synchronization between the intellectual property management data and the media data, transmitted in packets;

a first decoding step of decoding the encoded intellectual property management data according to the second timing information;

a second decoding step of decoding the encoded media data according to the first timing information; and a control step of controlling outputs of the media data according to the synchronizing information and the decoded intellectual property management data.

17. A computer program product recorded on a computer-readable medium and embodying a computer-executable program for implementing the media data processing method recited in claim 16.

18. A media data processing method comprising:
an input step of inputting media data and intellectual property management data for managing intellectual property of the media data;
a first encoding step of encoding the media data;
a second encoding step of encoding the intellectual property management data;
a transmission step of transmitting in packets the encoded media data, first timing information that is related to the encoded media data to control decoding timings for the encoded media data, the encoded intellectual property management data, second timing information that is generated by making reference to the first timing information and is related to the encoded intellectual property management data to control decoding timings of the encoded intellectual property management data, and synchronizing information that has the same contents as the first timing information and is related to the encoded intellectual property management data to control synchronization between the intellectual property management data and the media data;

a receiving step of receiving bitstreams of the encoded media data, the first timing information that controls decoding timings for the encoded media data, the encoded intellectual property management data, the second timing information that controls decoding timings of the encoded intellectual property management data, and synchronizing information for synchronizing the intellectual property management data and the media data, transmitted in packets in the transmission step;

a first decoding step of decoding the encoded intellectual property management data according to the second timing information;

a second decoding step of decoding the encoded media data according to the first timing information; and a control step of controlling outputs of the media data according to the synchronizing information and the decoded intellectual property management data.

* * * * *

UNITED STATES PATENT AND TRADEMARK OFFICE
CERTIFICATE OF CORRECTION

PATENT NO. : 7,239,661 B2
APPLICATION NO. : 10/426312
DATED : July 3, 2007
INVENTOR(S) : Ando It is certified that error appears in the above-identified patent and that said Letters Patent is hereby corrected as shown below:

COVER PAGE, ITEM [57]:
ABSTRACT, Line 7, "transmitted in" should read -- transmits in --.

COLUMN 2:
Line 37, "Systems," should read -- system, --; and
Line 56, "bitstreams" should read -- bitstream --.

COLUMN 3:
Line 12, "data need" should read -- data needs --; and
Line 40, "transmitted" should read -- transmits --.

COLUMN 4:
Line 66, "operations" should read -- operation --.

COLUMN 5:
Line 29, "control" should read -- controls --;
Line 37, "in consistent" should read -- inconsistent --;
Line 40, "in consis-" should read -- inconsis- --;
Line 44, "in consistent" should read -- inconsistent --;
Line 49, "in consistent" should read -- inconsistent --;
Line 50, "assumes" should read -- it is assumed --;
Line 63, "update" should read -- updates --; and
Line 65, "have" should read -- has --.

COLUMN 6:
Line 37, "in consistent" should read -- inconsistent --; and
Line 54, "operations" should read -- operation --.

UNITED STATES PATENT AND TRADEMARK OFFICE
CERTIFICATE OF CORRECTION

PATENT NO. : 7,239,661 B2
APPLICATION NO. : 10/426312
DATED : July 3, 2007
INVENTOR(S) : Ando It is certified that error appears in the above-identified patent and that said Letters Patent is hereby corrected as shown below:

COLUMN 7:
Line 6, "corresponds" should read -- correspond --; and
Line 17, "of access" should read -- of the access --.

COLUMN 8:
Line 54, "constitute" should read -- constitutes --.

COLUMN 9:
Line 61, "MPEG-1" should read -- MPEG-4 --.

Signed and Sealed this

Twenty-fourth Day of June, 2008

JON W. DUDAS
*Director of the United States Patent and Trademark Office*